Jan. 5, 1960
N. THIEN-CHI ET AL
2,920,171
METHOD OF SEALING A PIECE IN ONE END OF
A TUBE MADE OF A SINTERED MATERIAL
Filed April 14, 1958
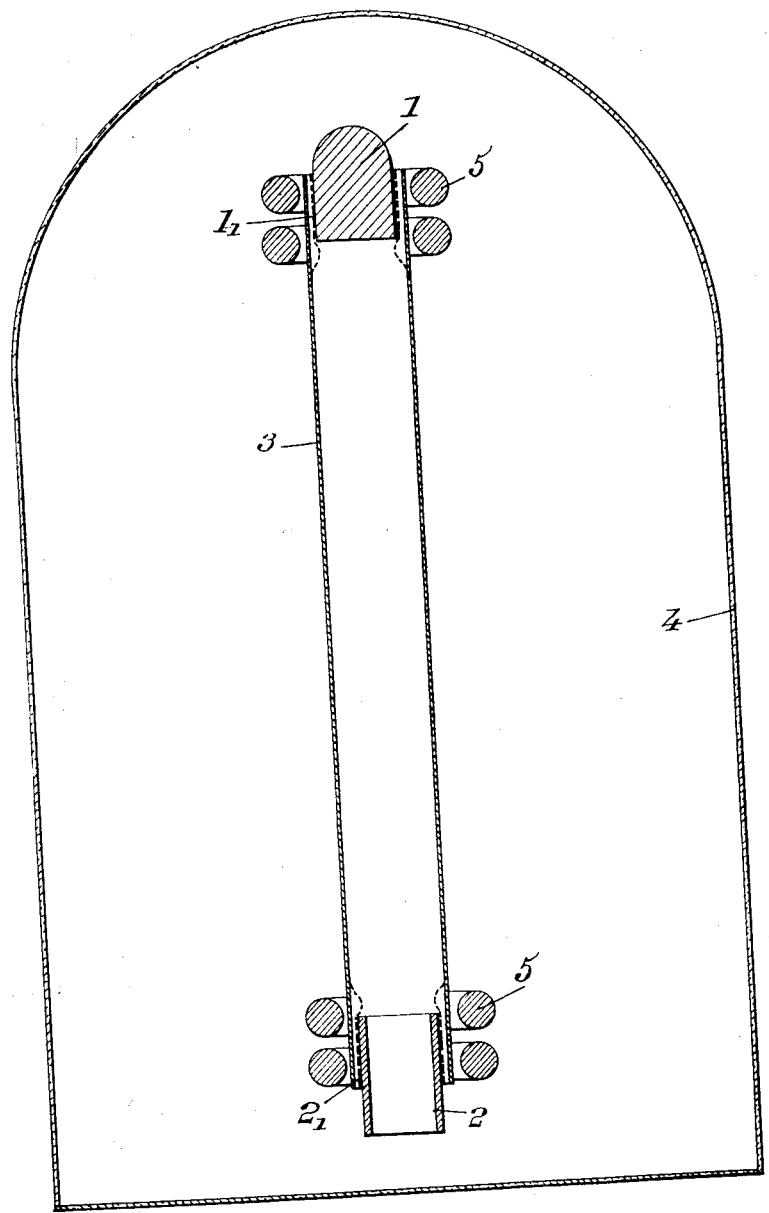

United States Patent Office 2,920,171
Patented Jan. 5, 1960

2,920,171

METHOD OF SEALING A PIECE IN ONE END OF A TUBE MADE OF A SINTERED MATERIAL

Nguyen Thien-chi and Pierre Plurien, Paris, France, assignors to Commissariat à l'Energie Atomique, Paris, France, a state administration of the laws of France Application April 14, 1958, Serial No. 728,172

Claims priority, application France April 19, 1957

2 Claims. (Cl. 219—9.5)

The present invention relates to a method of sealing a piece (either a plug or a tubular connection member) in one end of a tube made of a sintered material, in particular a porous metallic tube obtained by sintering.

The use of porous tubes of this kind is of great interest for the separation of some gases, in particular for the isotopic separation of uranium contained in a gaseous uranium hexafluoride.

The method according to our invention consists essentially in providing said piece with a cylindrical portion adapted to fit with a small transverse play, in the cold state, in the corresponding end of the tube, in engaging said cylindrical portion at ordinary temperature into said end, in heating said end to a temperature higher than the temperature of sintering of the tube, the whole being preferably disposed vertically, and finally in allowing the parts to cool down.

During the heating operation, the wall of the end of the tube is softened and deformed so as to come to bear against the adjacent cylindrical outer wall of the piece.

After the subsequent cooling, it is found that the material thus deformed has undergone a shrinkage sufficient to apply the inner wall of the tube with a fluid tight fit against the cylindrical portion of the piece.

According to a preferred embodiment of the invention, the end of the tube and the cylindrical portion of the piece are in the form of surfaces of revolution. The external diameter of said cylindrical portion of the piece is then given a value slightly smaller than that of the inner diameter of the end of the tube.

A preferred embodiment of this invention will be hereinafter described with reference to the accompanying drawing, given merely by way of example and in which the only figure illustrates, in vertical sectional view, the method for sealing, according to the present invention, a plug 1 and a tubular connection member 2 in the respective ends of a tube 3 made of a sintered material.

In the example that is being described, plug 1 and connection member 2 are metallic and, in particular, made of non porous sintered nickel and tube 3 has been obtained by sintering at 700° C. of a nickel powder.

These three elements 1, 2 and 3 are held in their vertical position as illustrated by the drawing by means of suitable supporting means (jaws or shoulders) not shown.

Plug 1 and connection member 2 are each provided with a cylindrical portion of revolution ($1_1$ and $2_1$) the outer diameter of which is 14 mm. at ordinary temperature.

At this temperature, the external diameter of tube 3 is 15 mm. and its thickness 0.2 mm.

The mean radial play between the adjacent walls of the tube and of pieces 1 and 2 is therefore 0.3 mm.

The whole is placed in a vacuum container 4 and the parts to be heated are located in the windings 5 of the inductor of a high frequency furnace, which permits of heating said parts to a temperature of about 1,100° C.

After cooling, the walls of the tube have assumed a shape analogous to that shown in dotted lines on the drawing.

In a general manner, while we have, in the above description, disclosed what we deem to be a practical and efficient embodiment of our invention, it should be well understood that we do not wish to be limited thereto as there might be changes made in the arrangement, disposition and form of the parts without departing from the principle of the present invention as comprehended within the scope of the accompanying claims.

What we claim is:

1. A method of sealing a piece in the end of a porous tube made of a sintered material, said tube having a thin wall, which method comprises providing said piece with a cylindrical portion adapted to fit, in the cold state, coaxially in said end of the tube with a radial play of the same order of magnitude as the thickness of the wall of said tube, engaging said cylindrical portion of said piece into said tube and at ordinary temperature, heating said end of the tube in a vacuum by means of a high frequency furnace to a temperature higher than the temperature of sintering of the tube and allowing the whole to cool down.

2. A method according to claim 1 for sealing a piece to the end of a tube obtained by sintering at 700° C. of a nickel powder, in which the heating of the end of the tube is conducted at 1,100° C., said end of the tube and the piece engaged therein being placed in the inductor of a high frequency furnace.

References Cited in the file of this patent

UNITED STATES PATENTS

| | | |
|---|---|---|
| 1,652,164 | Coyer | Dec. 13, 1927 |
| 2,625,637 | Garner et al. | Jan. 13, 1953 |
| 2,779,134 | Gates | Jan. 29, 1957 |
| 2,798,141 | Longacre | July 2, 1957 |